(12) United States Patent
Wang et al.

(10) Patent No.: US 7,892,392 B2
(45) Date of Patent: Feb. 22, 2011

(54) METHOD FOR MANUFACTURING OVER-CURRENT PROTECTION DEVICE

(75) Inventors: David Shau Chew Wang, Taipei (TW); Jyh Ming Yu, Kaohsiung (TW)

(73) Assignee: Polytronics Technology Corporation, Hsinchu (TW)

( * ) Notice: Subject to any disclaimer, the term of this patent is extended or adjusted under 35 U.S.C. 154(b) by 570 days.

(21) Appl. No.: 12/041,322

(22) Filed: Mar. 3, 2008

(65) Prior Publication Data
US 2008/0289751 A1    Nov. 27, 2008

(30) Foreign Application Priority Data
May 23, 2007   (TW) .............................. 96118270 A

(51) Int. Cl.
| B29C 65/00 | (2006.01) |
| B29C 65/02 | (2006.01) |
| B29C 65/18 | (2006.01) |
| B32B 37/04 | (2006.01) |
| B32B 37/06 | (2006.01) |
| B32B 37/16 | (2006.01) |
| B32B 38/00 | (2006.01) |
| B32B 38/04 | (2006.01) |
| H02H 5/04 | (2006.01) |

(52) U.S. Cl. .................... 156/309.3; 156/250; 156/252; 156/256; 156/306.6; 156/309.6; 174/524; 338/324; 361/103

(58) Field of Classification Search ............ 156/244.27, 156/250, 252, 256, 306.6, 309.3, 309.6, 312, 156/313; 252/500, 510, 511, 513, 518.1; 219/541, 546; 338/22 R, 324; 29/827; 174/524; 361/103
See application file for complete search history.

(56) References Cited

U.S. PATENT DOCUMENTS

| 5,849,129 | A | * | 12/1998 | Hogge et al. ............ 156/244.27 |
| 6,143,206 | A | * | 11/2000 | Handa et al. ................. 252/500 |
| 2004/0027765 | A1 | * | 2/2004 | Yu et al. ..................... 361/103 |

* cited by examiner

Primary Examiner—Mark A Osele
Assistant Examiner—Christopher C Caillouet
(74) Attorney, Agent, or Firm—Connolly Bove Lodge & Hutz LLP

(57) ABSTRACT

A method for manufacturing an over-current protection device comprises a step of providing at least one current sensitive device and a step of pressing. The current sensitive device comprises a first electrode foil, a second electrode foil and a PTC conductive layer physically laminated between the first and second electrode foils. The pressing step is to press the current sensitive device at a predetermined temperature, thereby generating at least one overflow portion at sides of the PTC conductive layer to form the over-current protection device. The predetermined temperature is higher than the softening temperature of the PTC conductive layer. The over-current protection devices manufactured according to the present invention have superior resistance distribution.

18 Claims, 5 Drawing Sheets

METHOD FOR MANUFACTURING OVER-CURRENT PROTECTION DEVICE

BACKGROUND OF THE INVENTION (A) Field of the Invention

The present invention relates to a manufacturing method of an over-current protection device, and more particularly, to a method for manufacturing an over-current protection device having positive temperature coefficient (PTC) conductive composite material.

(B) Description of the Related Art

Because the resistance of conductive composite materials having a positive temperature coefficient (PTC) characteristic is very sensitive to temperature variation, it can be used as the material for current sensing devices, and has been widely applied to over-current protection devices or circuit devices. The resistance of the PTC conductive composite material remains extremely low at normal temperature, so that the circuit or cell can operate normally. However, when an over-current or an over-temperature event occurs in the circuit or cell, the resistance instantaneously increases to a high resistance state (e.g. at least $10^4 \Omega$), which is the so-called trip. Therefore, the over-current will be eliminated so as to protect the cell or the circuit device.

The manufacturing of a low resistance (volumetric resistance<0.1 $\Omega$-cm) PTC over-current protection device is generally performed as follows. First, crystalline polymer, e.g., high density polyethylene (HDPE) or low density polyethylene (LDPE) and oxygen-free conductive ceramic powder (e.g., titanium carbide) are mixed using, for example, a Hakke mixer at 50 rpm and 160° C. for 15 minutes to form a PTC material. The PTC material is then put into a hot presser. A steel plate and Teflon mold-release cloth are disposed at top and bottom surfaces of the PTC material and pressed at 180° C. to form a PTC laminate. Sequentially, two electrode foils are disposed at top and bottom surfaces of the PTC laminate, and the combination is pressed to create a PTC composite material, i.e., a structure of electrode foil/PTC laminate/electrode foil, of a thickness between 0.45 and 0.65 mm. The PTC composite material is punched into a plurality of chips (current protection devices) of around 2.8 mm×3.5 mm. Table 1 shows the initial resistances, sizes and the resistance after 10 cycles of life test of twelve samples of the over-current protection devices made according to the above method. A cycle of the life test is to apply 12 volts and 10 amperes to the over-current protection device for 10 seconds followed by 60 seconds with no current. The initial resistances ranges from 0.0101$\Omega$ to 0.0195$\Omega$, while the standard deviation is 0.003. In low resistance applications, the initial resistances in Table 1 vary drastically; therefore the distribution needs to be improved.

TABLE 1

| Sample | Initial Resistance ($\Omega$) | Width (mm) | Thickness (mm) | Resistance after 10 cycles of life test ($\Omega$) |
|---|---|---|---|---|
| 1 | 0.0180 | 2.81 | 0.75 | 0.0251 |
| 2 | 0.0146 | 2.83 | 0.73 | 0.0276 |
| 3 | 0.0194 | 2.82 | 0.74 | 0.0258 |
| 4 | 0.0163 | 2.84 | 0.74 | 0.0301 |
| 5 | 0.0195 | 2.84 | 0.75 | 0.0192 |
| 6 | 0.0165 | 2.81 | 0.73 | 0.0226 |
| 7 | 0.0124 | 2.84 | 0.73 | 0.0184 |
| 8 | 0.0101 | 2.83 | 0.73 | 0.0189 |
| 9 | 0.0135 | 2.83 | 0.71 | 0.0283 |
| 10 | 0.0140 | 2.85 | 0.70 | 0.0209 |
| 11 | 0.0119 | 2.85 | 0.69 | 0.0208 |
| 12 | 0.0116 | 2.85 | 0.67 | 0.0221 |
| Mean | 0.0148 | 2.8333 | 0.7225 | 0.0233 |
| Min. | 0.0101 | 2.8100 | 0.6700 | 0.0184 |
| Max. | 0.0195 | 2.8500 | 0.7500 | 0.0301 |
| Standard Deviation | 0.0030 | 0.0137 | 0.0238 | 0.0038 |

For high voltage (over 250V) applications of the PTC over-current protection device, the manufacturing method is similar to that of the low resistance PTC over-current protection device, and is familiar to those skilled in the art. The only differences are changes in the composition and percentage of PTC material. For example, high density polyethylene (HDPE), magnesium hydroxide and carbon black are used. In order to withstand high voltages, the thickness of the device is greater than that of low resistance PTC over-current protection devices. Therefore, high voltage PTC over-current protection devices manufactured according to the above method have non-uniform initial resistances. Table 2 shows initial resistances and thicknesses of fifteen samples of PTC over-current protection devices for high voltage applications, in which the distribution of the initial resistances, with standard deviation of 1.6279, is larger than that shown in Table 1 (with standard deviation of 0.003).

TABLE 2

| Sample | Initial Resistance ($\Omega$) | Thickness (mm) |
|---|---|---|
| 1 | 6.83 | 3.58 |
| 2 | 7.75 | 3.56 |
| 3 | 6.93 | 3.59 |
| 4 | 7.58 | 3.56 |
| 5 | 4.55 | 3.46 |
| 6 | 6.9 | 3.54 |
| 7 | 10.18 | 3.57 |
| 8 | 9.94 | 3.57 |
| 9 | 6.03 | 3.52 |
| 10 | 9.64 | 3.56 |
| 11 | 8.42 | 3.53 |
| 12 | 7.83 | 3.51 |
| 13 | 5.89 | 3.59 |
| 14 | 7.23 | 3.58 |
| 15 | 5.55 | 3.51 |
| Mean. | 7.4167 | 3.5487 |
| Min. | 4.55 | 3.46 |
| Max. | 10.18 | 3.59 |
| Standard Deviation | 1.6279 | 0.0366 |

SUMMARY OF THE INVENTION

The present invention is mainly directed to providing a method for manufacturing an over-current protection device with uniform initial resistance distribution. By pressing at a predetermined temperature, the sides of the PTC conductive layer of the over-current protection device generate overflow portions so as to improve the distribution of the initial resistances.

The present invention provides a method for manufacturing an over-current protection device. The method comprises a step of providing at least one current sensitive device and a step of pressing. The current sensitive device comprises a first electrode foil, a second electrode foil and a PTC conductive layer physically laminated between the first and second electrode foils. The current sensitive device comprises at least one crystalline polymer and conductive filler. The pressing step is to press the current sensitive device at a predetermined temperature, thereby generating at least one overflow portion at a side of the PTC conductive layer to form the over-current protection device. The volume ratio of overflow portion to the total PTC layer volume is higher than 0.25% and less than 30%. The predetermined temperature is higher than the softening temperature, or preferably higher than the melting point, of the PTC conductive layer. The first and second metal foils comprise rough surfaces of nodules and physically contact the PTC conductive layer.

In an embodiment, the current sensitive device further comprises a first conductive plate and a second conductive plate formed at the outer surfaces of the first electrode foil and the second electrode foil, respectively. The conductive filler may comprise oxygen-free conductive ceramic powder with a grain size between 0.01 μm and 30 μm, and preferably between 0.1 μm and 10 μm. The volumetric resistance of the oxygen-free conductive ceramic powder is less than 500 Ω-cm, and the oxygen-free ceramic powder is evenly distributed in the crystalline polymer. The crystalline polymer can be selected from the group consisting of HDPE, LDPE, polypropylene, polyvinyl fluoride and the co-polymer thereof. The over-current protection device has superior resistance distribution and is suitably used for both low resistance (volumetric resistance less than 0.1 Ω-cm) and high voltage endurance (over 250 V) applications.

DETAILED DESCRIPTION OF THE INVENTION

In order to make other objects and achievements of the present invention clear and to provide a complete understanding of the present invention, further description accompanied by figures is provided in detail below.

Figure 1:
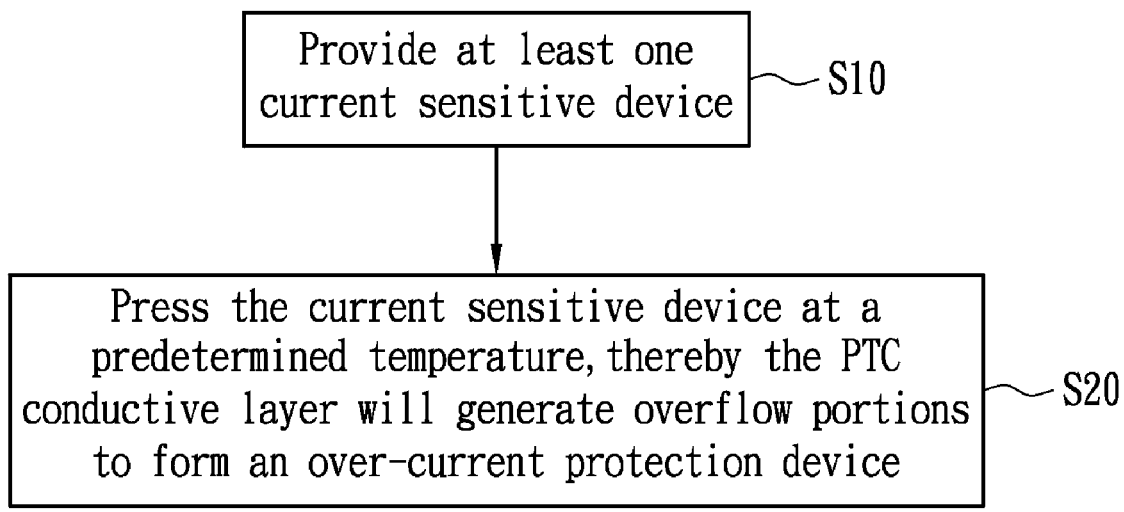
FIG. 1 is a flow chart for the method of manufacturing an over-current protection device according to an embodiment of the present invention.
Figure 2A:
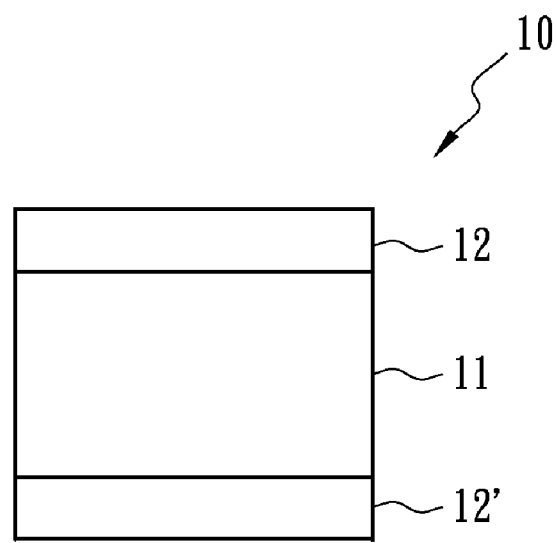
FIGS. 2A and 2B show the devices corresponding to the steps of the flow chart of FIG. 1.
Figure 2B:
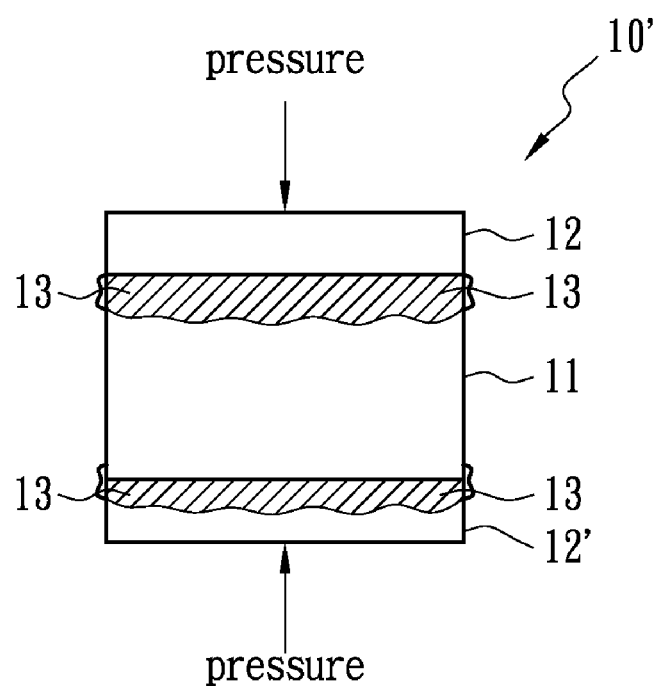

FIG. 1 illustrates a flow chart of the method for manufacturing an over-current protection device in accordance with the present invention. FIGS. 2A and 2B show the devices corresponding to the steps of the flow chart of FIG. 1. First, at least one current sensitive device 10 (Step S10) is provided. The current sensitive device 10 is manufactured as follows. A batch mixer (Hakke mixer) is set at 160° C., and at least one crystalline polymer and conductive filler are added and mixed at 50 rpm for 15 minutes to form PTC material. In this embodiment, the crystalline polymer comprises HDPE of 4.8 grams and LDPE of 9.8 grams, and the conductive filler is titanium carbide of 117.6 grams. The PTC material is then put into a hot presser. A steel plate and Teflon mold-release cloth are disposed at top and bottom surfaces of the PTC material, so as to form a PTC conductive layer 11 by pressing at 180° C. Sequentially, two electrode foils 12 and 12' are disposed at top and bottom surfaces of the PTC conductive layer 11, and the combination is pressed to form a PTC composite material, i.e., a structure of electrode foil/PTC laminate/electrode foil, of a thickness between 0.45 and 0.65 mm. The PTC composite material is punched into a plurality of chips (current protection devices 10) of around 2.8 mm×3.5 mm. After step S10, the current sensitive device 10 is pressed at a temperature higher than the softening point of the PTC conductive layer 11, and preferably higher than the melting point of the PTC conductive layer 11, thereby forming at least one overflow portion 13 at sides of the PTC conductive layer 11 so as to form an over-current protection device 10' (Step S20). The area of the overflow portion 13 is smaller than the area of the PTC chip (i.e., current sensitive device 10).

The overflow volume can be calculated from the reduction of PTC layer thickness:

$$Vol_{overflow} = W \times L \times (T_{initial} - T_{final})$$

Where, $Vol_{overflow}$ is the volume of the overflow portion,

W is the chip width,

L is the chip length, $T_{initial}$ is the initial thickness of the PTC layer, and $T_{final}$ is the final thickness of the PTC layer after pressing.

The volume ratio of overflow portion to total PTC volume can be calculated as follows:

$$\text{Overflow volume ratio} = (T_{initial} - T_{final})/T_{initial}$$

Figure 3A:
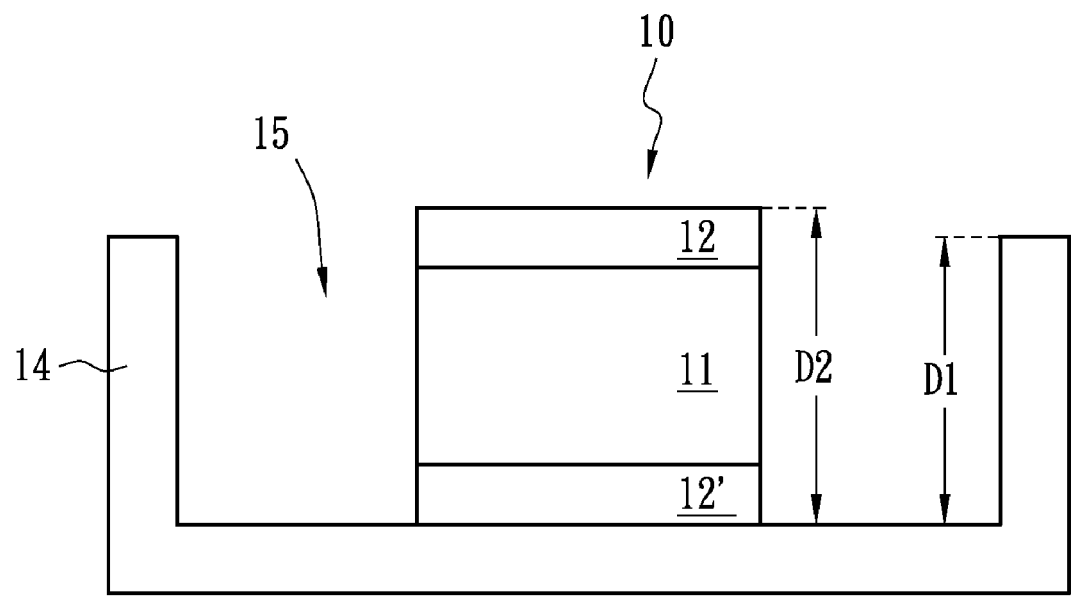
FIG. 3A to 3C show the manufacturing of an over-current protection device according to a first embodiment and a second embodiment of the present invention.
Figure 3B:
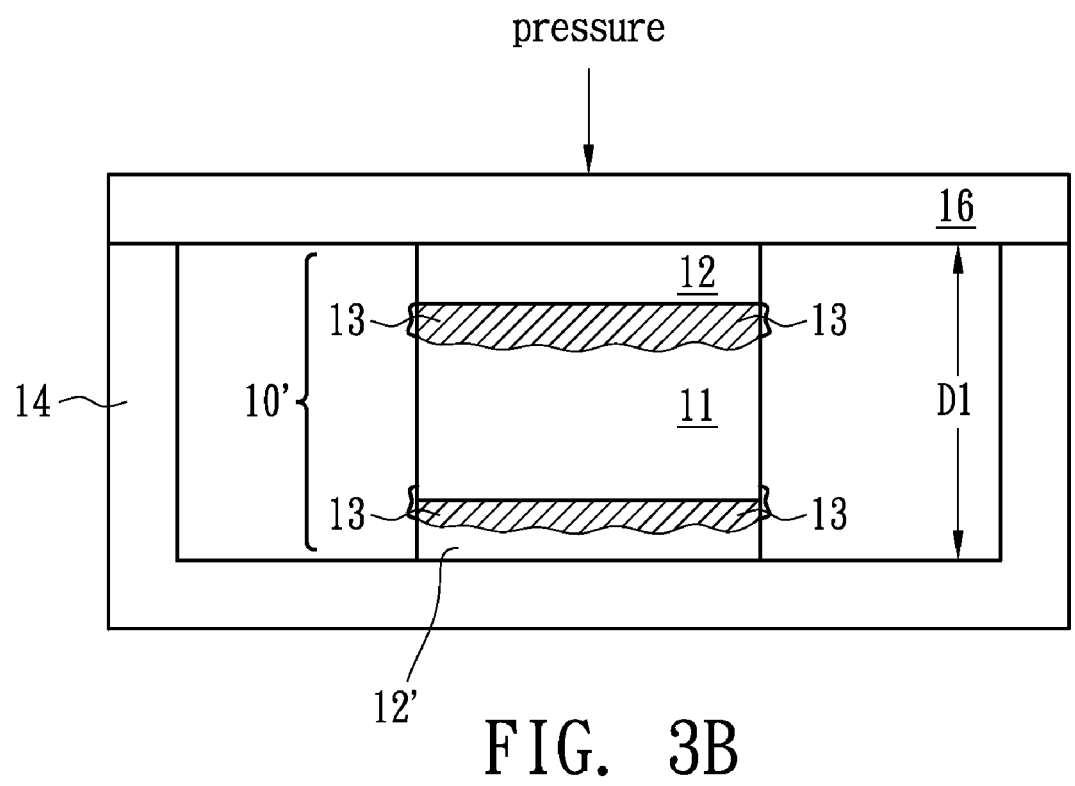

In an embodiment, Step S20 is described in detail below. Referring to FIG. 3A, the current sensitive device 10 finished by the process of Step S10 is put in a concave 15 of a container 14. The concave 15 has a depth D1 that is smaller than the thickness D2 of the current sensitive device 10. Referring to FIG. 3B, a hot bar 16 presses the current sensitive device 10 at a temperature higher than 195° C. and a pressure greater than 2.5 Mpa until the thickness D2 of the current sensitive device 10 is compressed to be equivalent to the depth D1 and such status is held for 5 seconds. Accordingly, some materials of PTC conductive layer 11 will be pressed to overflow out of the electrode foils 12 or 12' to form overflow portions 13, thereby forming an over-current protection device 10'.

Figure 3C:
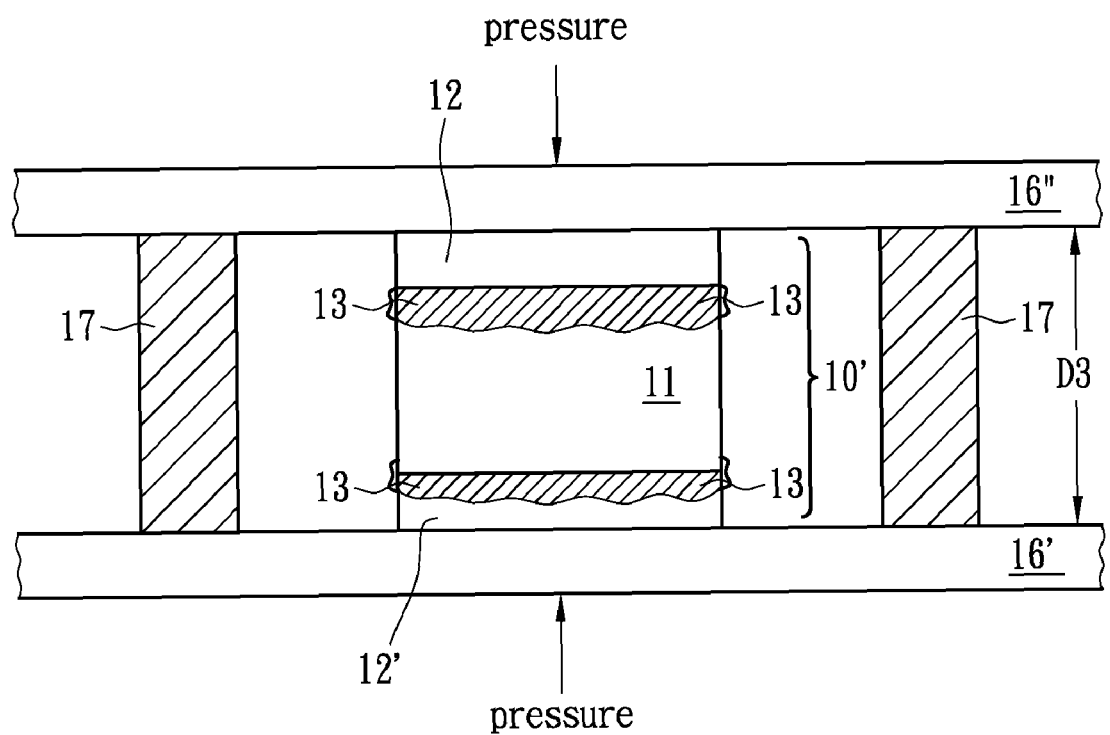

In a second embodiment, the process shown in FIG. 3B (Step S20) is changed to that shown in FIG. 3C. The current sensitive device 10 is put on a hot bar 16', and two spacers 17 of a fixed height D3 are disposed at two sides of the current sensitive device 10. The fixed height D3 is less than the thickness D2 of the current sensitive device 10. Another hot bar 16" presses the current sensitive device 10 at a temperature higher than 195° C. and a pressure greater than 2.5 Mpa until the thickness D2 of the current sensitive device 10 is compressed to be equivalent to the fixed depth D3 and such status is held for 5 seconds. Accordingly, some materials of PTC conductive layer 11 will be pressed to overflow out of the electrode foils 12 or 12' to form overflow portions 13, thereby forming the over-current protection device 10'.

Figure 4A:
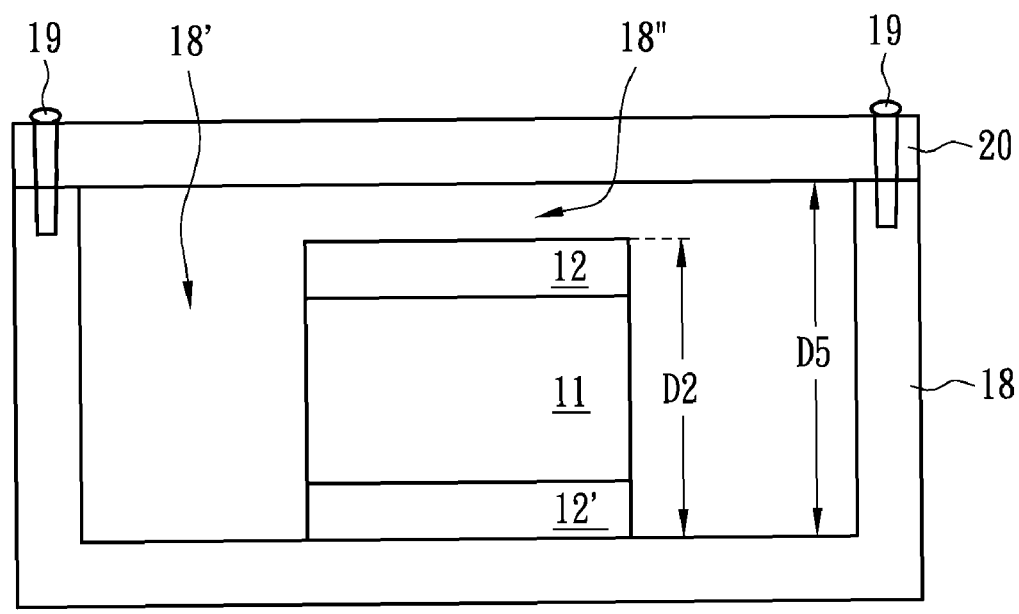
FIGS. 4A and 4B show the manufacturing of an over-current protection device according to a third embodiment of the present invention.
Figure 4B:
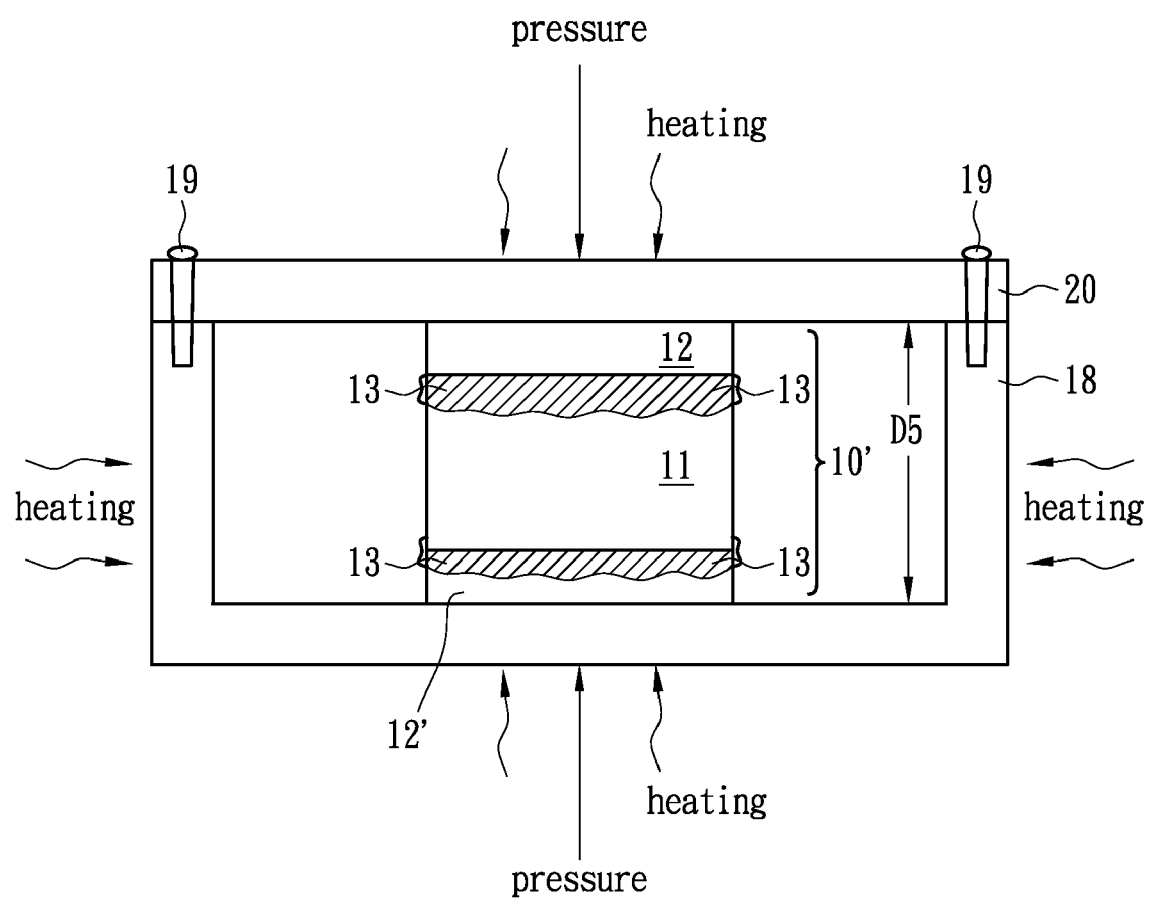

In a third embodiment, Step S20 is described in detail below. Referring to FIG. 4A, the current sensitive device 10 manufactured according to Step S10 is put in a concave 18' of a container 18. The concave 18' has a fixed depth D5, which is greater than the thickness D2 of the current sensitive device 10. Sequentially, a plurality of connecting members 19 are used to secure an upper cover 20 to the container 18, thereby a gap 18" is formed between the upper cover 20 and the current sensitive device 10. Referring to FIG. 4B, the container 18 together with the upper cover 20 and the current sensitive device 10 is put into an oven and heated to 140° C. for at least 3 hours. The current sensitive device 10 is heated and inflated (along a first direction) but restricted to the fixed depth D5. The thickness of the current sensitive device is then equivalent to the depth D5, and some material of the PTC conductive layer 11 is pressed to overflow out of the electrode foils 12 or 12' to form overflow portions 13 (along a second direction perpendicular to the first direction), thereby forming the over-current protection device 10'.

The above embodiments use a single current sensitive device. However, a plurality of current sensitive devices can be pressed concurrently (Step S20). After the plurality of current sensitive devices are pressed, the current sensitive devices are of the same thickness. Moreover, before pressing the top and bottom surfaces of the current sensitive device 10 shown in FIG. 2A, i.e., the outer surfaces of the electrode foils 12 and 12', the current sensitive devices can be connected with conductive plates, which can be formed by reflowing solder on the surfaces of the electrode foils 12 and 12'.

Table 3 shows the initial resistances, sizes and the resistance after 10 cycles of life test of twelve samples of the over-current protection devices manufactured according to the first embodiment of the present invention. A cycle of the life test is to apply 12 volts and 10 amperes to the over-current protection device for 10 seconds followed by 60 seconds with no current. The samples are the over-current protection devices in Table 1 further subjected to pressing (Step S20). The overflow volume ratio ranges from 20.89% to 29.33%. The initial resistance distribution ranges from 0.0074Ω to 0.0089Ω, and the average initial resistance is 0.0083Ω (with standard deviation of 0.0004), which is better than that shown in Table 1 with an average initial resistance 0.0148Ω (with standard deviation of 0.003). The average resistance after 10 cycles of life test is 0.0098Ω (with standard deviation of 0.0003), which is better than that shown in Table 1 with an average resistance 0.0233Ω (with standard deviation of 0.0038). The volumetric resistances of the twelve samples are obviously all less than 0.1 Ω-cm.

and carbon black of 16.24 grams. The manufacturing method is similar to that of Table 2 except for the pressing step S20.

TABLE 4

| Sample | Initial Resistance (Ω) | Thickness (mm) | Overflow Volume Ratio |
|---|---|---|---|
| 1 | 6.2 | 3.51 | 0.0196 |
| 2 | 6.63 | 3.45 | 0.0309 |
| 3 | 5.92 | 3.46 | 0.0362 |
| 4 | 6.74 | 3.48 | 0.0225 |
| 5 | 5.94 | 3.41 | 0.0145 |
| 6 | 6.96 | 3.47 | 0.0198 |
| 7 | 7.19 | 3.5 | 0.0196 |
| 8 | 7.82 | 3.51 | 0.0168 |
| 9 | 7.17 | 3.51 | 0.0028 |
| 10 | 7.57 | 3.5 | 0.0169 |
| 11 | 6.92 | 3.49 | 0.0113 |
| 12 | 7.26 | 3.48 | 0.0085 |
| 13 | 5.67 | 3.53 | 0.0167 |
| 14 | 6.7 | 3.52 | 0.0168 |
| 15 | 5.91 | 3.46 | 0.0142 |
| Mean. | 6.7067 | 3.4853 | 0.0178 |
| Min. | 5.67 | 3.41 | 0.0028 |
| Max. | 7.82 | 3.53 | 0.0362 |
| Standard Deviation | 0.6562 | 0.0316 | 0.0081 |

In comparing Table 3 to Table 1, as well as comparing Table 4 to Table 2, it can be seen that the low resistance over-current protection device of the present invention has better initial resistance distribution, better initial resistance and better resistance after cycle life test in comparison with the prior art. Moreover, the over-current protection device for high voltage applications shows superior initial resistance distribution. Therefore, the method for manufacturing over-current protection device of the present invention certainly achieves the objectives.

TABLE 3

| Sample | Initial Resistance (Ω) | Width (mm) | Thickness (mm) | Resistance after 10 cycles of life test (Ω) | Volumetric Resistance (Ω-cm) | Overflow Volume Ratio |
|---|---|---|---|---|---|---|
| 1 | 0.0083 | 3.02 | 0.54 | 0.0095 | 0.0151 | 0.2800 |
| 2 | 0.0082 | 3.03 | 0.53 | 0.0094 | 0.0152 | 0.2740 |
| 3 | 0.0082 | 3.01 | 0.53 | 0.0099 | 0.0152 | 0.2838 |
| 4 | 0.0074 | 3.03 | 0.53 | 0.0098 | 0.0137 | 0.2838 |
| 5 | 0.0089 | 3.01 | 0.53 | 0.0104 | 0.0165 | 0.2933 |
| 6 | 0.0083 | 3.08 | 0.53 | 0.0096 | 0.0153 | 0.2740 |
| 7 | 0.0086 | 3.04 | 0.53 | 0.0095 | 0.0159 | 0.2740 |
| 8 | 0.0087 | 3.15 | 0.53 | 0.0097 | 0.0161 | 0.2740 |
| 9 | 0.0086 | 3.12 | 0.53 | 0.0100 | 0.0159 | 0.2535 |
| 10 | 0.0082 | 3.02 | 0.52 | 0.0102 | 0.0155 | 0.2571 |
| 11 | 0.0081 | 3.03 | 0.52 | 0.0099 | 0.0153 | 0.2464 |
| 12 | 0.0080 | 3.13 | 0.53 | 0.0097 | 0.0148 | 0.2090 |
| Mean | 0.0083 | 3.0558 | 0.5292 | 0.0098 | 0.0154 | 0.2669 |
| Min. | 0.0074 | 3.0100 | 0.5200 | 0.0094 | 0.0137 | 0.2090 |
| Max. | 0.0089 | 3.1500 | 0.5400 | 0.0104 | 0.0165 | 0.2933 |
| Standard Deviation | 0.0004 | 0.0484 | 0.0049 | 0.0003 | 0.0007 | 0.0227 |

Table 4 shows the initial resistances and thicknesses of twenty samples of PTC over-current protection devices for high voltage (over 250V) applications manufactured according to the third embodiment of the present invention. The overflow volume ratio ranges from 0.28% to 3.62%. The standard deviation of the initial resistances is 0.656. The PTC conductive material of the samples in Table 4 comprises HDPE of 21.84 grams, magnesium hydroxide of 17.92 grams The above-described embodiments of the present invention are intended to be illustrative only. Numerous alternative embodiments may be devised by those skilled in the art without departing from the scope of the following claims.

What is claimed is:

1. A method for manufacturing an over-current protection device, comprising the steps of:
   providing at least one current sensitive device comprising a first electrode foil, a second electrode foil and a PTC conductive layer physically laminated between the first and second electrode foils, the PTC conductive layer comprising at least one crystalline polymer and a conductive filler; and pressing the current sensitive device at a predetermined temperature higher than the softening temperature of the PTC conductive layer to form at least one overflow portion at sides of the PTC conductive layer and to control a overflow volume ratio to be higher than 20% and lower than 30%, so as to form the over-current protection device.

2. The method of claim 1, wherein the predetermined temperature is higher than a melting temperature of the PTC conductive layer.

3. The method of claim 1, wherein the area of the overflow portion is smaller than that of the current sensitive device.

4. The method of claim 1, wherein the current sensitive device further comprises:
   a first conductive plate connected to an outer surface of the first electrode foil; and
   a second conductive plate connected to an outer surface of the second electrode foil.

5. The method of claim 1, wherein the current sensitive device is formed by punching.

6. The method of claim 1, wherein the step of pressing the current sensitive device comprises:
   putting the current sensitive device into a container of a fixed depth, wherein the fixed depth is smaller than a thickness of the current sensitive device; and
   pressing the first electrode foil at a predetermined temperature to compress the current sensitive device to a thickness of the fixed depth.

7. The method of claim 1, wherein the step of pressing the current sensitive device comprises using hot bar pressing the first and second electrode foils of the current sensitive device so as to compress the current sensitive device to a fixed thickness.

8. The method of claim 7, wherein the fixed thickness is smaller than the initial thickness of the current sensitive device.

9. The method of claim 1, wherein the step of pressing the current sensitive device comprises restricting the current sensitive device to be inflated at a predetermined temperature to a fixed thickness along a first direction, and to form at least one overflow portion along a second direction perpendicular to the first direction by pressing the PTC conductive layer.

10. The method of claim 9, wherein the fixed thickness is larger than an initial thickness of the current sensitive device.

11. The method of claim 1, wherein the current sensitive device has a volumetric resistance less than 0.1 $\Omega$-cm.

12. The method of claim 11, wherein the crystalline polymer comprises high density polyethylene and low density polyethylene.

13. The method of claim 11, wherein the conductive filler is titanium carbide.

14. The method of claim 1, wherein the current sensitive device can withstand a voltage greater than 250 volts.

15. The method of claim 14, wherein the crystalline polymer comprises high density polyethylene.

16. The method of claim 14, wherein the conductive filler is carbon black.

17. The method of claim 1, wherein the over-current protection devices have the same thicknesses.

18. The method of claim 1, wherein the step of pressing the current sensitive device is performed at a pressure larger than 2.5 Mpa.

* * * * *